United States Patent Office 3,025,247
Patented Mar. 13, 1962

3,025,247
MANUFACTURE OF PLATINUM METAL-CONTAINING CATALYST
Stephen M. Oleck, Moorestown, N.J., assignor to Socony Mobil Oil Company, Inc., a corporation of New York
No Drawing. Filed June 11, 1959, Ser. No. 819,564
7 Claims. (Cl. 252—466)

This invention relates to the manufacture of catalysts. More particularly, the present invention is directed to the preparation of platinum metal-containing hydrocarbon conversion catalysts.

Catalysts containing one or more metals of the platinum series, i.e. platinum, palladium, osmium, ruthenium, iridium, and rhodium have been employed in promoting, controlling and directing the course of various reactions. The above metals being relatively expensive have been used in minor amount generally deposited on a carrier or support. The most extensive use, to date, of catalysts of the above category has been in the reforming of petroleum fractions to increase the octane number thereof. For such purpose, generally, a platinum group metal deposited on an inorganic refractory oxide such as alumina or combinations of alumina and silica which may optionally contain minor proportions of a halogen, boria or other component designed to impart acidity to the catalytic composite has been used.

Catalysts comprising essentially such inorganic oxide supports impregnated with between about 0.01 and about 5 percent by weight and more usually between about 0.1 and about 1 percent by weight of platinum metal have heretofore been prepared by bringing the inorganic oxide support into contact with a platinum metal compound, for example chloroplatinic acid, and drying the resulting mixture. Such method has been unsatisfactory since the platinum metal so deposited collects during the drying operation in the form of agglomerates on the surface of the support resulting in a non-homogeneous catalyst characterized by a large platinum crystallite size and low catalytic activity. In order to overcome the above disadvantage, it has heretofore been the practice to subject the solution of platinum metal compound to treatment with hydrogen sulfide or ammonium sulfide either before or after contacting such solution with the inorganic oxide support. The platinum metal is thereby converted into the insoluble sulfide which is incapable of migrating during the drying step. Such method, however, has been accompanied by certain inherent disadvantages, one of which is the release of highly toxic hydrogen sulfide to the atmosphere. Another disadvantage resides in the fact that with an aqueous solution of platinum compound, the concentration of patinum must be controlled below about 0.7 gram per liter before contacting with hydrogen sulfide in order to avoid immediate precipitation of platinum sulfide. The use of concentrated impregnating solutions is thus eliminated and careful control must be exercised when working in the vicinity of the above noted concentration in order to forestall premature precipitation and agglomeration of the platinum metal sulfide.

A further disadvantage is that with the use of hydrogen or ammonium sulfide treating solution, sulfiding may take place in an extremely short interval of time in localized areas where the sulfur-containing component makes initial contact with the solution of platinum metal compound thereby defeating the achievement of uniform distribution of platinum metal on the support due to the non-uniform dispersion of platinum metal sulfide with the accompanying formation of large crystallites of platinum metal.

In accordance with the present invention, there has now been discovered an improved method for preparing a catalytically active platinum metal deposit of small crystal size on an inorganic refractory oxide. The method of the invention overcomes the disadvantages inherent in the above-noted procedures and affords a method for producing platinum-containing catalysts of high stability, selectivity and activity useful in the conversion of hydrocarbon fractions, such as the reforming of gasoline fractions to produce products of enhanced octane number. The method of the invention is further applicable utilizing solutions of platinum compounds in which platinum may be present in concentrations greatly in excess of the above-noted limit of 0.7 gram per liter without encountering premature precipitation of platinum metal sulfide.

It is accordingly an object of the present invention to provide an improved method for the manufacture of catalysts containing one or more of the platinum group metals. Another object is the provision of a platinum-containing catalyst of high stability, selectivity and activity for the conversion of hydrocarbons particularly in hydrogenation, dehydrogenation, isomerization, hydrocracking and reforming reactions. A still further object of the invention is to provide a method for effecting uniform distribution of a platinum metal on an inorganic oxide support leading to a resulting homogeneous catalytic composite of small platinum metal crystallite size.

The above and other objects which will be apparent to those skilled in the art are achieved in accordance with the present invention. In one embodiment, the present invention is concerned with a method of manufacturing a catalyst which comprises bringing an inorganic refractory oxide support into contact with a water-soluble compound of a metal of the platinum series in aqueous medium, contacting the aqueous slurry so obtained with a solid metallic element higher in the electromotive series than the platinum metal for a period of time sufficient to effect deposition and fixation of the platinum metal upon said support, separating said solid metallic element from the resulting aqueous composite of said support impregnated with platinum metal and drying and calcining said composite. In another embodiment, the invention comprises a method for preparing a catalyst of a platinum metal deposited on alumina by contacting, in the presence of water, alumina and a water-soluble platinum metal compound, bringing the resulting aqueous slurry into contact with aluminum for a period of time sufficient to effect deposition and fixation of the platinum metal upon the alumina, separating the aluminum from the resulting aqueous composite of alumina impregnated with platinum metal and drying and calcining the composite so obtained. In a still further embodiment, the invention involves production of a platinum-alumina catalyst by bringing an aqueous slurry of alumina into contact with chloroplatinic acid, inserting solid aluminum metal in the resulting mixture for a period of time sufficient to effect deposition and fixation of platinum upon the alumina, withdrawing the solid aluminum metal from the resulting aqueous slurry of platinum-alumina composite and drying and calcining such composite. If the aluminum or other reducing metal is in a finely divided form, i.e. powdered metal, it may be retained in the aqueous slurry and become a part of the support for the platinum metal, providing of course that the presence of such finely divided metal does not adversely affect the catalytic properties in the use for which the resulting catalyst is intended. Thus, powdered aluminum of high purity may be employed to effect reduction of the platinum metal in the presence of an aqueous slurry of alumina and thereafter be retained in such slurry to yield an ultimate catalyst consisting of a support of alumina having dispersed therein finely divided aluminum metal and having deposited thereon a small amount of platinum metal.

The supported platinum metal catalysts produced by the process of this invention have been found to be equal in reforming activity to catalysts made by employing hydrogen sulfide to fix the patinum metal on the inorganic oxide support. The catalysts prepared by the process of the present invention have further unexpectedly been found to be characterized by superior platinum stability as compared with catalysts wherein hydrogen sulfide was employed as the platinum fixing agent.

Thus, in accordance with the process described herein a water-soluble platinum metal compound is contacted, in aqueous medium, with a metal higher in the electromotive series than the platinum metal and in the presence of an inorganic refractory oxide support. It has been found that under such conditions, platinum metal is deposited upon and becomes fixed to the inorganic oxide support. The resulting composite obtained is thereafter dried and calcined. A catalyst of an inorganic refractory oxide impregnated with a homogeneous uniform deposition of platinum metal is thereby obtained. Such catalyst has been found to be characterized by high activity, selectivity and stability in hydrocarbon conversion reactions such as the reforming of petroleum hydrocarbons boiling in the gasoline range.

The metal employed for depositing platinum group metal from solution onto the inorganic oxide support may be any metal higher than platinum in the electromotive series which does not adversely affect desired catalytic properties of the resulting composite. The particular amount of such metal utilized for reduction of the compound of platinum metal generally will be within the approximate range of 0.009 percent to 10 percent by weight of the finished catalyst. Theoretically, the amount of such metal required is only that needed to supply sufficient electrons to satisfy the platinum metal to be deposited. For example, platinum in the form of $Pt^{++}$ requires two electrons as $Pt^{++} + 2e \rightarrow Pt$. Such can be supplied, for example, by aluminum as $\frac{2}{3} Al \rightarrow \frac{2}{3} Al^{+++} + 2e$. Thus, one mole platinum theoretically requires $\frac{2}{3}$ of a mole of aluminum for its reduction. As a practical matter, an amount of aluminum, or other metal higher in the electromotive series than platinum, in excess of theoretical is generally employed to provide rapid reduction of the platinum ions to metallic platinum. The time of contact between the aqueous slurry of inorganic oxide support, platinum metal compound, and the metal effecting deposition of platinum metal upon the support depends, in part, upon the extent of metal surface available for effecting desired deposition of the platinum metal and upon the temperature at which the mixture is maintained. In general, the lower the temperature, the longer the time of contact required to produce catalysts of equivalent platinum metal content. At higher temperatures, for example about 200° F., it has been found that little difference exists between catalysts made at 3 and 7 hours contact time. Usually, the time of contact between (1) the aqueous slurry of inorganic oxide support and platinum metal compound and (2) the metal utilized to effect deposition of platinum metal on the support will be between about 1 minute and about 24 hours at a temperature between about 32 and about 210° F. The presence of liquid water in the reaction mixture is essential for carrying out the process of the present invention. Thus, if it is desired to carry out the deposition of platinum metal at temperatures above the boiling point of water, sufficient pressure must be maintained to provide a liquid phase. The temperature may accordingly extend up to the critical temperature for water, namely 374° C. The presence of water in the reaction mixture is essential in assuring the transfer of electrons from the reducing metal to the platinum metal to be deposited.

It is contemplated that any water-soluble platinum metal compound capable of being converted into a platinum metal by contact with a reducing metal higher in the electromotive series than the platinum metal to be deposited on an inorganic oxide support may be used in the preparation of the present catalyst. Representative compounds of platinum include platinum tetrachloride, chloroplatinic acid, derivatives thereof with halogens and the like. When other metals of the platinum series are employed, corresponding compounds of such metals will be used.

The inorganic refractory oxide support used in the present method of catalyst preparation is generally alumina or composites of silica and at least one oxide of an element from Groups IIA, IIIB, or IVA of the Mendeléeff Periodic Table. Thus, the inorganic refractory oxide support may be alumina, silica, silica-alumina, silica-zirconia, silica-alumina-zirconia, silica-magnesia, silica-alumina-thoria, and silica-alumina-magnesia as well as activated siliceous clays. The inorganic oxide support may be activated with a halogen particularly fluorine or chlorine prior to impregnation. The inorganic oxide support may be prepared by any of a variety of methods well known in the art. Thus, an alumina base may be prepared by precipitation from an aqueous solution of aluminum chloride, aluminum sulfate, aluminum nitrate or other salt by the addition thereto of ammonium hydroxide or an alkali compound. The alumina base may also be prepared by acidification of sodium aluminate or other soluble aluminate. Also, the alumina base may be prepared by reaction of pure aluminum metal with water in the presence of mercury or a mercury compound. Composites of silica-alumina or composites of silica with other of the above-noted oxides may be prepared by methods well known in the art employing cogelation or other impregnation techniques. Thus, taking the preparation of silica-alumina composites as a typical example, cogels of silica and alumina may be prepared by intimately admixing an acidic solution of an aluminum salt with sodium silicate to yield a silica-alumina hydrosol which sets after lapse of a suitable period of time to a hydrogel. The resulting hydrogel is thereafter base-exchanged to remove zeolitic sodium, water-washed, dried preferably in superheated steam and finally calcined at 900° F. to 1400° F. in air. Alternatively, a silica-alumina composite may be produced by separately forming a hydrogel or gelatinous precipitate of silica and a hydrogel or gelatinous precipitate of alumina and ball-milling or otherwise intimately admixing the silica and alumina together to yield a resultant silica-alumina composite. In such instances, the silica is suitably prepared by mixing an acid solution, for example, an aqueous sulfuric acid solution with sodium silicate. If it is desired to prepare silica initially free of alkali metal ions such may be accomplished by effecting hydrolysis of alkyl silicates, i.e. ethyl silicate. Alumina is readily prepared by the addition of ammonium or alkali metal hydroxide to an aqueous aluminum salt solution, for example an aluminum salt of a mineral acid such as aluminum nitrate, aluminum chloride or aluminum sulfate. As another alternate procedure for preparing silica-alumina composite, a synthetic silica gel or precipitate may be prepared in accordance with one of the foregoing processes and alumina may be deposited thereon by contacting the silica gel or precipitate with an aqueous aluminum salt solution followed by the addition of a sufficient amount of ammonium hydroxide to effect precipitation of alumina on the silica. The composite of silica and alumina can further be prepared by contacting a preformed silica gel with an aqueous aluminum salt solution thereafter removing the impregnated silica gel from the solution and heating to a sufficiently elevated temperature to decompose the aluminum salt laid down by impregnation upon alumina so that the resulting product is silica impregnated with alumina. All of the foregoing methods for preparing composites of silica and alumina are well known in the art and are referred to herein merely as illustrative of suitable preparation procedures.

It will be realized that composites of other oxides than silica and alumina and composites of more than two oxides may, with suitable modification, likewise be prepared in accordance with the general procedure above outlined.

Halogen may be added to the inorganic oxide support, if desired, in any suitable manner and either before or after precipitation or gelation of the oxide. While the halogen may be used as such it is generally preferred to utilize hydrogen halide or an aqueous solution of the hydrogen halide for ease in handling. When alumina is the refractory oxide, halogen is preferably incorporated into the alumina before forming into particles and such may be accomplished by the use of an acid such as hydrogen fluoride, hydrogen chloride, hydrogen bromide and/or hydrogen iodide. In some instances, volatile salts such as ammonium fluoride, ammonium chloride, etc, may be employed. The amount of halogen, when added, is generally in the range of from 0.1 percent to about 10 percent by weight of the final catalyst. Chemically combined fluorine being more active will ordinarily be used in the range of from about 0.1 percent to about 5 percent by weight of the refractory oxide on a dry basis. The chlorine content will generally be within the range of from about 0.1 percent to about 8 percent and preferably from about 0.2 percent to about 5 percent by weight of the final catalyst on a dry basis. The halogen may comprise a mixture of two or more halogens and the total amount of halogen will generally be within the ranges set forth herein.

It is to be understood that the various combinations of components which may be prepared and use in accordance with the present invention are not necessarily equivalent. In general, the refractory oxide or mixture of the oxides will comprise a major proportion of the catalyst and range from about 95 percent to about 99.99 percent by weight of the catalyst composite. The concentration of the metal of the platinum series will generally be in the approximate range of 0.01 percent to 5 percent by weight and more usually between about 0.1 percent and about 1 percent by weight of the catalyst. It is understood that when desired, two or more metals of the platinum series may be utilized in the catalyst composite.

Of the aforementioned inorganic refractory oxides, alumina has been known to impart stability to the platinum metal in subsequent aging thereby permitting use of the catalyst over an extended period of time in hydrocarbon conversion operations without necessitating regeneration. Accordingly alumina is, for present purposes, considered to be the preferred inorganic oxide support. Such alumina may be combined with minor proportions of promoting agents such as halogens, boria and the like. The inorganic refractory oxide support desirably has a surface area greater than about 10 square meters per gram and preferably in excess of 30 square meters per gram and may extend up to 500 square meters per gram or more. The term "surface area" as used herein, designates the surface area of the inorganic oxide support as determined by the adsorption of nitrogen according to the method of Brunnauer et al., Journal American Chem. Soc. 60 309, et seq. (1938).

It is essential that a medium capable of supporting the transfer of electrons such as water be present in the reaction mixture during the reduction of the platinum metal ions to platinum metal. Thus, the inorganic oxide support during treatment with the reducing metal to effect deposition thereon of a platinum metal should desirably be in the form of an aqueous slurry or suspension or present as a hydrosol. The water content of the mixture should be such as to afford transfer of electrons from the reducing metal to the platinum metal ions in solution.

The metal employed for effecting reduction of the platinum metal ions is, as noted hereinabove, a metal higher in the electromotive series than the platinum metal to be deposited. The reducing metal is desirably one of the components of the resulting catalyst either as a portion of the catalyst base or as one of the catalytic components. The reducing metal should be one which does not adversely affect the desired catalytic properties of the resulting catalyst. Suitable representative metals for effecting the desired deposition of platinum metal include copper, tin, antimony, nickel, cobalt, cadmium, iron, chromium, gallium, zinc, manganese, aluminum, and magnesium. Of this group, metallic aluminum is accorded preference. The metal utilized for effecting reduction may be in any suitable physical form such as bars, sheets, pellets, plates, turnings, powder etc. Such metal in the form of a large piece, for example, a bar provides a convenient means for insertion in and subsequent removal from the reaction mixture.

After contact of the inorganic oxide support with an aqueous solution of a platinum metal compound in the presence of a reducing metal of the type described hereinabove, for a suitable period of time, the resulting mixture is dried at a temperature generally between about 150° F. and about 400° F. for a period of between about 1 and about 24 hours. The dried composite is then calcined at a temperature between about 800 and about 1200° F. for about 2 to about 48 hours in an oxygen-containing atmosphere. If desired, the catalyst mixture may be contacted with hydrogen or a hydrogen-containing gas after calcining. Alternatively, the calcining step may be carried out in the presence of hydrogen or a hydrogen-containing gas. It will also be understood that calcining treatment may be effected during utilization of the catalyst for hydrocarbon conversion at elevated temperatures within the aforementioned approximate range of 800 to 1200° F.

The catalyst may be prepared in any desired form depending upon the specific purpose for which it is intended. Thus, the catalyst may be in the form of a fine powder for use in a fluid type process or the catalyst may be formed into pellets or particles of other suitable shape, generally prior to the calcination step. The particles may be formed into spheroidal particles employing well-known bead-forming techniques such as those described by Marisic in U.S. 2,384,946. Alternatively, the catalyst after drying may be ground to a fine particle size mixed with a lubricant such as stearic acid, rosin, graphite, or the like, and subjected to extrusion to form particles of desired size by methods well known to the art after which the formed particles may be calcined as described above.

The catalysts described herein are useful in hydrocarbon conversion reactions which are catalyzed by metals of the platinum group. Thus, the catalysts prepared in accordance with the present process are useful for reforming, isomerization, hydrogenation, dehydrocyclization, polymerization, hydrocracking, oxidation, desulfurization, dehydrogenation and other hydrocarbon conversion processes. As will be realized, the processing conditions will depend upon the specific reaction conditions involved as well as the charge stock employed. It is contemplated that the catalyst produced in accordance with the present process will be used in the aforesaid conversion reactions under substantially the same process conditions as have heretofore been described in the art.

Thus, considering reforming as a typical hydrocarbon conversion process in which catalysts produced in accordance with the present method may be employed, such process is generally carried out at a temperature between about 700° F. and 1000° F. and preferably at a temperature between about 800° F. and 975° F. The pressure during reforming is generally within the range of about 100 to about 1000 p.s.i.g. and preferably between about 200 and about 700 p.s.i.g. The liquid hourly space velocity employed, i.e. the liquid volume of hydrocarbon per hour per volume of catalyst is between about 0.1 and about 10 and preferably between about 0.5 and about 4. In general, the molar ratio of hydrogen to hydrocarbon charge employed is between about 1 and about 20 and preferably between about 4 and about 12. Hydrocarbon charge stocks subjected to reforming generally comprise mixtures of hydrocarbons and particularly petroleum distillates boiling within the approximate range of 60° F. to 450° F. which range includes naphthas, gasolines, and kerosene. The gasoline fraction may be a full boiling range gasoline. It is, however, generally preferred to use a selected fraction such as naphtha having an initial boiling point of between about 150° F. and about 250° F. and an end boiling point of between about 350° F. and about 425° F.

The following illustrative and comparative examples will serve to illustrate the method of the invention without limiting the same:

Example 1

An alumina support was initially formed by reaction of 327 grams of pure aluminum metal turnings of 0.008 inch thickness and random length between 3 and 10 inches with 9.3 liters of a solution containing 1.85 grams HgO and 0.77 gram $HgCl_2$ in water for about 96 hours at a temperature of about 80° F. Unreacted aluminum was removed from the reaction product. The resulting aqueous slurry of alumina was filtered to give a hydrated precipitate containing, on a dry basis, 22.47 weight percent solids and containing, by X-ray analysis, 9 percent alpha alumina monohydrate and 91 percent alpha and beta alumina trihydrate.

To 2110 grams of the filter cake were added, while mixing, 233 cc. of an aqueous solution of chloroplatinic acid containing 1.661 grams of platinum. The resulting slurry was mixed for an additional five minutes. The mixture so obtained was then divided into three equal portions which were used in preparation of the catalysts of Examples 2, 3 and 4.

Example 2

To 789 grams of the slurry from Example 1 were added, while stirring, 123 grams of water saturated with $H_2S$. This water was made by bubbling $H_2S$ through water for ½ hour at a room temperature of 70° F. The $H_2S$ treated slurry was stirred for an additional 30 minutes and thereafter dried at a temperature of 240° F. for 16 hours. The dried cake was ball-milled 24 hours and then mixed with stearic acid and tableted into pills of ⅛" diameter by 1/16" height. The resulting tablets were calcined in a 1 percent oxygen-nitrogen atmosphere to 900° F. and subsequently in an atmosphere of 100 percent air to a temperature of 925° F. The resulting catalyst contained 0.34 weight percent platinum, 0.42 weight percent chlorine, and had a surface area of 349 square meters per gram.

Example 3

An aluminum metal bar was inserted into 789 grams of the slurry from Example 1. The slurry was heated to 200° F. At the end of 3 hours the aluminum metal bar was removed from the slurry. It had lost 4.9 grams in weight. The slurry was thereafter dried for 16 hours at 240° F. in air. The dried cake was ball-milled for 24 hours, mixed with water, and extruded to 1/16" diameter particles. The particles so obtained were dried for 8 hours at 240° F. and thereafter calcined in air to a temperature of 925° F. The resulting catalyst contained 0.34 weight percent platinum, 0.42 weight percent chlorine, and had a surface area of 321 square meters per gram.

Example 4

An aluminum metal bar was inserted into 789 grams of the slurry from Example 1. The slurry was heated to 200° F. At the end of 7 hours, the aluminum metal bar was removed. It had lost 7.6 grams in weight. The resulting slurry was dried for 16 hours at 240° F. and the dried cake was ball-milled 24 hours. The ground catalyst was mixed with water and extruded to 1/16" diameter particles. The particles so obtained were dried 8 hours at 240° F. and thereafter calcined in air to a temperature of 925° F. The resulting catalyst contained 0.34 weight percent platinum, 0.37 weight percent chlorine and had a surface area of 266 square meters per gram.

The catalysts of Examples 2, 3 and 4 were tested for activity by reforming a Mid-Continent naphtha having an approximate boiling range of 200 to 380° F. (ASTM) to 98 Octane Number (Res.+3 cc. TEL). The reforming was carried out at a pressure of 500 p.s.i.g., a liquid hourly space velocity of 2 and a hydrogen to hydrocarbon mol ratio of 10. The test results are set forth below:

| Catalyst | Example 3 | Example 4 | Example 2 |
|---|---|---|---|
| Naphtha inlet temperature required to produce 98 Octane Reformate, ° F. | 917 | 911 | 915 |

The three catalysts of Examples 2, 3 and 4 were analyzed for platinum crystallize size after being heated in oxygen for 20 hours at 1300° F. The results of such analysis are shown below:

| Catalyst | Example 3 | Example 4 | Example 2 |
|---|---|---|---|
| Small Size Platinum: | | | |
| Size, Å | 38 | 38 | 38 |
| Percent | 90 | 85 | 75 |
| Large Size Platinum: | | | |
| Size, Å | 175 | 210 | 260 |
| Percent | 10 | 15 | 25 |
| Relative Particle Area (RPA) | 2.42 | 2.31 | 2.08 |

Relative (platinum) particle area (RPA) is calculated as percent of given size/size in Å and designates the area of platinum metal available for catalytic function.

It will be seen from the above results that the reforming activity as measured by the temperature required to produce 98 Octane Number reformate for the catalyst prepared using a reducing metal to effect deposition of platinum metal was equal to that of conventionally produced catalyst using hydrogen sulfide as the fixing agent. It will further be noted that the catalysts produced by the process of the present invention are characterized by superior platinum stability as determined by the growth in platinum crystallite size. Thus, it will be seen from the above data that the platinum in the catalyst prepared by the process of the invention (Examples 3 and 4) grew less than the comparative catalyst prepared utilizing the conventional hydrogen sulfide technique (Example 2). The platinum area available for carrying out the catalytic function was thus 11 to 16 percent higher after being subjected to the stability tests for catalysts prepared in accordance with the process described herein as compared with a catalyst prepared utilizing the conventional hydrogen sulfide treatment. Moreover, the catalyst produced using a metal to effect reduction of the platinum metal ions in accordance with the present process had the very practical and desirable advantage of avoiding the hazards attributable to the use of toxic hydrogen sulfide.

It will be understood that the present invention is not limited solely to the preparation of catalysts of a platinum metal deposited on an inorganic refractory oxide support, but is applicable to other systems wherein a metallic element may be used to reduce or deposit another metallic catalyst upon a suitable support. Thus, it is contemplated that the method described herein may feasibly be employed in the preparation of cobalt oxide, molybdic oxide or platinum catalysts on alumina, silica, silica-alumina or other inorganic oxide support. The metal deposited should be below the metal causing the depositing in the electromotive series. The metal causing the depositing should be present in sufficient quantity to effect the desired deposition, i.e. it must supply enough electrons to reduce the metal in solution to the extent desired. It is accordingly to be understood that the above description

I claim:

1. A method for manufacturing a catalyst which comprises bringing a major proportion of an inorganic refractory oxide support into contact with an aqueous solution of a water-soluble compound of a platinum metal present in a concentration corresponding to 0.01 to 5 weight percent of said metal, on a finished catalyst basis; effecting contact between the resulting aqueous slurry and a solid metallic element higher in the electromotive series than the platinum metal and present in a quantity at least sufficient to effect reduction of ions of said platinum metal to the metallic state, said contact being carried out for a period of time sufficient to deposit and fix the platinum metal upon said support and drying and calcining the resulting composite.

2. A method of manufacturing a catalyst which comprises bringing a major proportion of an inorganic refractory oxide support into contact with an aqueous solution of a water-soluble platinum metal compound present in a concentration corresponding to 0.01 percent to 5 percent by weight of said platinum metal, on a finished catalyst basis; effecting contact of the resulting aqueous slurry and a solid metallic element higher in the electromotive series than the platinum metal and present in an amount at least sufficient to effect reduction of ions of platinum metal to the metallic state, said contact being carried out for a period of between about 1 minute and about 24 hours at a temperature between about 32 and about 374° F.; thereafter separating the solid metallic element from the resulting aqueous composite of said support impregnated with platinum metal and drying and calcining said composite.

3. A method of manufacturing a catalyst which comprises contacting, in the presence of water, a major proportion of alumina and a minor proportion of a water-soluble platinum metal compound present in a concentration corresponding to 0.01 percent to 5 percent by weight of said platinum metal, on a finished catalyst basis; bringing the resulting aqueous slurry into contact with a quantity of aluminum at least sufficient to effect reduction of the ions of platinum metal to the metallic state; maintaining said contact for a period of time sufficient to effect deposition and fixation of the platinum metal upon the alumina, separating the aluminum from the resulting aqueous composite of alumina impregnated with platinum metal and drying and calcining said composite.

4. A method of manufacturing a catalyst consisting essentially of between about 0.01 and about 5 percent by weight of platinum deposited on an alumina support which comprises bringing an aqueous slurry of alumina into contact with a water-soluble platinum compound present in a concentration corresponding to an amount of platinum, on a finished catalyst basis, within the aforesaid range, contacting the resulting aqueous slurry with a metallic element higher in the electromotive series than platinum and present in a quantity at least sufficient to effect reduction of ions of platinum to metallic platinum for a period of between about 1 minute and about 24 hours at a temperature between about 32° and about 374° F., separating said metallic element from the resulting aqueous composite of alumina impregnated with platinum and drying and calcining said composite.

5. A method of manufacturing a catalyst consisting essentially of a major proportion of an alumina support having deposited thereon a minor proportion of platinum which comprises bringing an aqueous slurry of alumina into contact with a solution of chloroplatinic acid in the presence of a quantity of solid aluminum at least sufficient to effect reduction of platinum-containing ions contained in said solution to metallic platinum, maintaining said contact for a period of time sufficient to deposit and fix platinum upon the alumina, separating solid aluminum from the resulting aqueous slurry of platinum-alumina composite and drying and calcining said composite.

6. A method of manufacturing a catalyst which comprises bringing an aqueous slurry of alumina into contact with an aqueous solution of water-soluble platinum compound present in a concentration corresponding to 0.01 percent to 5 percent by weight of platinum, on a finished catalyst basis, said contact being effected in the presence of a quantity of solid aluminum at least sufficient to effect reduction of platinum-containing ions in said solution to metallic platinum, maintaining said contact for a period of time sufficient to effect deposition and fixation of platinum upon the alumina, and drying and calcining the resulting composite.

7. A method of manufacturing a catalyst consisting essentially of an alumina support having deposited thereon between about 0.01 and about 5 percent by weight of platinum which comprises bringing an aqueous slurry of alumina into contact with a chloroplatinic acid solution of concentration corresponding, on a finished catalyst basis, to an amount of platinum within the aforesaid range, inserting a solid bar of aluminum metal into the resulting mixture of a period of between about 1 minute and about 24 hours at a temperature between about 32° and about 374° F., thereafter withdrawing the solid aluminum bar from the resulting aqueous slurry of platinum-alumina composite and drying and calcining said composite.

References Cited in the file of this patent

UNITED STATES PATENTS

| | | |
|---|---|---|
| 2,611,736 | Haensel | Sept. 23, 1952 |
| 2,662,861 | Riblett et al. | Dec. 15, 1953 |
| 2,866,748 | Feller | Dec. 30, 1958 |